No. 793,287. Patented June 27, 1905.

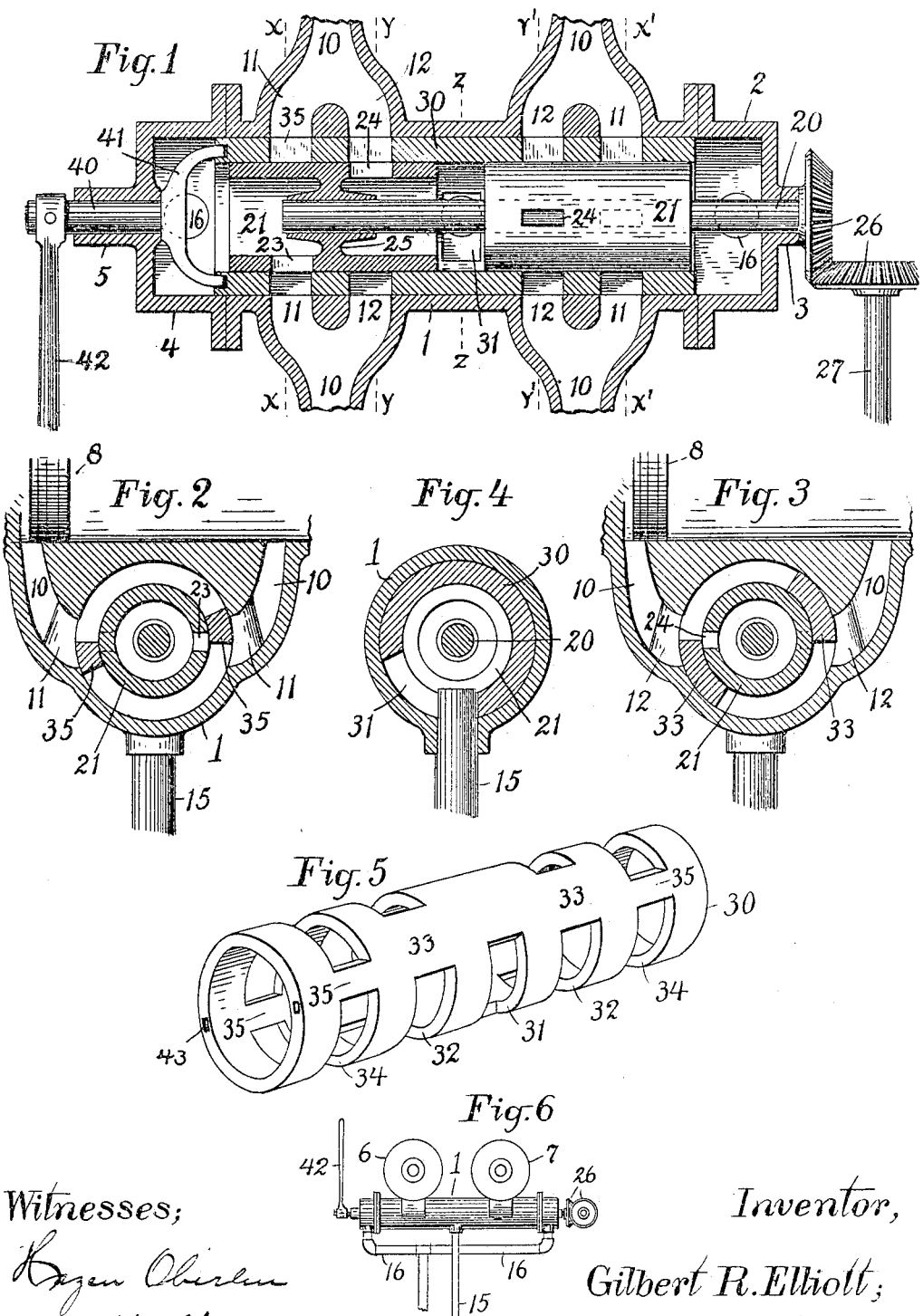

UNITED STATES PATENT OFFICE.

GILBERT R. ELLIOTT, OF BOSTON, MASSACHUSETTS.

ROTARY VALVE.

SPECIFICATION forming part of Letters Patent No. 793,287, dated June 27, 1905.

Application filed January 6, 1902. Serial No. 88,569.

*To all whom it may concern:*

Be it known that I, GILBERT R. ELLIOTT, a subject of the King of Great Britain, and a resident of the city of Boston, in the county of Suffolk, State of Massachusetts, have invented certain new and useful Improvements in Rotary Valves, of which the following is a full, clear, and exact description.

The object of this invention is the construction of an improved valve for use in connection with comparatively low power double engines, and particularly for engines designed to run steam automobiles, launches, &c.

Referring to the drawings forming part of this specification, Figure 1 is a central longitudinal horizontal section of my valve complete. Fig. 2 is a cross-section thereof on the line X X in Fig. 1. Fig. 3 is a cross-section of the same on the line Y Y in Fig. 1. Fig. 4 is a cross-section on the line Z Z in Fig. 1. Fig. 5 is a perspective view of the slotted shell comprising a part of the valve; and Fig. 6 is an end elevation, on a much smaller scale, of the double-engine cylinders having my valve formed as a part thereof.

The casing 1 of this valve is cylindrical in contour and closed at its ends by caps or heads 2, suitably bolted thereto, the casing, the posts, and the cylinders 6 7 being of a single integral casting.

Fitting steam-tight within the casing is the slotted shell or cut-off valve 30, adapted to be revolved or adjusted by means of the lever 42, the shaft 40 passing through the boss 5 of the left-hand head 2, and the forks or clutch 41, the ends of whose prongs enter suitable holes 43 in the end of the shell 30, as shown in Figs. 1 and 5. Said lever being fixed on said shaft, any swing imparted to said lever moves said shell in a corresponding manner.

Live steam is introduced within the valve through the tube 15, entering at the under side of the casing 1 and having its extremity reaching through a slot 31 in the shell 30. Other slots in said shell are stopped or terminated by bars or uncut parts of the shell constituting the various cut-off valves, as more fully set forth hereinafter.

Fitting steam-tight within the shell or cut-off valve 30 are the main inlet-valves 21, mounted upon the shaft 20 and revolved by the latter synchronously with the shaft driven by the double engine. A shaft 27, geared to said shaft 20 by equal bevel-gears 26 and also to the drive-shaft by similar gears, is my preferable means for thus rotating the main inlet-valves. It will be noticed that the shaft 20 has its only bearing in the boss 3 of the right-hand head 2, terminating at its opposite end at the point at which it passes through the left-hand main inlet-valve. Hence although the casing viewed externally appears to have a single shaft passing entirely through it yet the shaft-sections at the two ends are wholly separate and perform different work.

In Fig. 1 the two drums or inlet-valves 21 are shown differently, the left-hand one being in section, while the other is not. In construction, however, they are precisely alike, their only difference being that one is fixed on the shaft 20 at an angle of forty-five degrees in advance of the other. Each drum or main inlet-valve 21 is formed with a central web or partition 25, separating the drum into two parts, and also serving to mount the same upon the shaft 20. Through each drum are two ports or slots 23 24 on opposite sides of the partition 25, but otherwise diametrically opposite. These slots I prefer to term the "valve-ports."

As shown in Fig. 1, the cylinder-ports 10, which are four in number and extend to the respective ends of the two cylinders, each branch into two mouths through the casing, one coming into the plane of the valve-ports 23 and the other to the valve-ports 24. These mouths are designated by the reference-numerals 11 and 12 and are hereinafter referred to as the "cylinder-ports."

The slots 34 through the shell 30 are near the ends of the latter and in the same transverse planes with the cylinder-ports 11 and the valve-ports 23. Each said slot is nearly a semicircle in extent, as shown in Figs. 2 and 5, the uncut portions constituting the cut-off blocks or cut-off valves 35, while the walls of said slots serve to prevent the escape of steam in a direction parallel with the shaft 20. In the same manner the slots 32 extend in the same planes with the ports 12 and 24, but are shorter than the slots 34 in order to have the blocks or cut-off valves 33 substantially broader than the blocks 35 for the purpose hereinafter set forth.

The operation of my valve is as follows: The live steam enters through the pipe or tube 15 and fills the entire space within the two approximate sections of the drums 21. The drums being in motion, the instant a valve-port 24 comes out from behind a cut-off block 33 the steam rushes through such port and the cylinder-port 12 in communication therewith, the flow continuing until the valve-port has passed behind the opposite cut-off block 33. The steam thus admitted to one end of a cylinder forces the piston-head 8 along the cylinder in the well-known manner. Coincident with the steam admission when the valve-port 24 moves from beneath a cut-off block 33 the exhaust valve-port 23 passes from beneath a cut-off block 35, and so permits the exhaust-steam to flow from the opposite end of the cylinder into the casing-head and from thence through the exhaust-pipes 16. In the same manner the steam flows in turn through all the valve-ports and keeps the engine in continuous action.

As above set forth, the cut-off blocks 33 are much broader than the blocks 35. The object of this is to cut off the admission of steam to the cylinders at three-fifths stroke, and so to work expansively, the blocks 35 being made only just wide enough to properly cushion the termination of the piston-head's stroke.

Inasmuch as the steam is admitted between the two drums 21, its longitudinal pressure is perfectly balanced between their two partitions 25, held rigidly together by the shaft 20. The main inlet-valves being thus perfectly balanced, practically no power is required for turning them or retaining them in place longitudinally. For this latter purpose the bevel-gears 26 are fully sufficient. Further, since the live steam is admitted to the center of the casing only, while the exhaust alone is in contact with its heads, there is no need for any packing for the shafts 20 40 where they pass through the said heads. This not only saves considerable expense, but all the friction between such packing and the shafts.

In addition to the function of admitting steam within the valve performed by the slot 31 in the shell 30 I cause it to serve, in conjunction with the inwardly-protruding end of the pipe 15, the work of keeping said shell from end play and also that of limiting the rotative adjustment of the shell. The prevention of end play is performed by having said pipe end of substantially the same diameter as the width of the slot 31, while the limiting of the turn of the shell is obtained by the contacting of the ends of said slot with said projecting end. The importance of the latter particular arises from the fact of my locating the edges of the cut-off blocks exactly in line with the vertical centers of the widened cylinder-ports, as shown in Figs. 2 and 3 and set forth in my Patent No. 676,179. Whenever the cut-off valve or shell 30 is shifted in order to reverse the engine, it is essential to bring it to rest with the cut-off blocks in exactly the positions quoted, and this is done by the contact of the pipe 15 with an end of the slot 31. In the control of this engine I use the lever 42 for performing the work of stopping, starting, reversing, and slowing up, as follows: By moving said lever to bring the cut-off blocks wholly over the cylinder-ports 24, access of steam to the cylinders is cut off and the engine stopped. By moving said parts until said blocks only partially close the cylinder-ports, the engine is slowed down, while a throw clear over, reverses the engine. This one feature alone renders my valve especially valuable for steam-automobiles, where the reduction of number of levers and parts to manipulate is exceedingly essential.

As shown in the drawings, the valve-casing is located below the engine-cylinders, and the cylinder-ports 10 open directly down from the under side of the cylinders to the valve, thereby giving a clear drainage for the water of condensation from the cylinders to the valve. Moreover, the exhaust-pipes 16 open vertically downward from the under side of the valve-casing, and so continue such drainage out from the valve. To thus have the exhaust-pipes drain from the valve it is necessary to have them open from the under periphery of the casing. In order to shorten as much as possible the part of the casing which must be accurately bored and ground for the reception of the shell 30 and still give room for the exhaust-pipes 16, I prefer to make the heads 2 cup-shaped, as shown in Fig. 1, and tap said pipes into the peripheries of said heads.

Although I have described Figs. 2 and 3 as "sectional views on the lines X X and Y Y in Fig. 1," yet said views differ from sections on the lines X' X' Y' Y' in Fig. 1 only in a slightly-advanced position of the valve-ports 23 24 in the main inlet-valve or drum 21.

As shown in Fig. 1, the bevel-gear 26 serves not only to rotate the shaft 20, but to retain the same and the drums 21 thereon from end play. This is done by the contact of the gear on the shaft 21 against the boss 3 for one direction and for the other by the pressure of the two gears against each other.

What I claim as my invention, and for which I desire Letters Patent, is as follows, to wit:

1. A multicylinder-engine constructed with a valve-casing common to all the cylinders, a rotary main inlet-valve for each cylinder located within said casing and rigidly united, a slotted sleeve or cut-off valve surrounding said main inlet-valves within said casing, cut-off blocks carried by said cut-off valve or sleeve, external means for rotatively adjusting said sleeve, and means for admitting live steam through said casing and sleeve between each pair of main inlet-valves, and exhausting from the opposite end of each said valve, substantially as described.

2. In combination, a double-cylinder engine, a valve-casing common to both cylinders, heads closing the ends of said casing, a shaft having bearings in one of said heads and terminating at one end in said casing, means for the rotation of said shaft joining the external end thereof to the drive-shaft of the engine, two main inlet-valves fixed on said shaft, a slotted shell or cut-off valve between said main inlet-valves and casing, means for admitting live steam between the adjoining ends of said main inlet-valves, exhaust-pipes from the ends of said casing, a short shaft penetrating the head opposite to that receiving the main inlet-valve shaft, an external lever fixed on said short shaft, and means joining said short shaft to said shell or cut-off valve, substantially as described.

3. In combination, two engine-cylinders, a cylindrical casing having ports communicating therewith, a rotary main inlet-valve within said casing, a cut-off valve between the main inlet-valve and casing, means for admitting steam to the interior of said casing, a cup-shaped head secured to each end of the casing, and exhaust-pipes opening radially from the peripheries of said heads, substantially as described.

4. In combination, a horizontal double-cylinder engine, a valve-casing common to both cylinders and located beneath the same, a rotary main inlet-valve for each cylinder within said casing, means for the admission of live steam between said main inlet-valves, and exhaust-pipes opening from the under side of said casing near its ends, substantially as described.

5. In combination, a double-cylinder engine, a cylindrical valve-casing common to both cylinders, an axially-arranged shaft in said casing having means for its rotation, two main inlet-valves fixed on said shaft and each consisting of a drum having a central web or partition and the diametrically opposite ports at opposite sides of said partition; and a shell fitting between said casing and main inlet-valves, said shell being suitably slotted to admit steam through it between said main inlet-valves, and to constitute the cut-off valves, substantially as described.

6. In a rotary valve, the combination of the cylindrical casing having the cylinder-ports, the rotary main inlet-valve, the shell slotted to constitute the cut-off valve and to admit live steam, and the steam-pipe entering radially said casing; and the live-steam slot in said shell; said slot and pipe end being mutually arranged to accurately limit the movement of said shell when turned to reverse the engine, substantially as described.

7. In a rotary valve, the combination with the casing, of the main inlet-valve revoluble within the same, the slotted shell located between said main inlet-valve and casing, a short shaft revoluble at an end of said casing and having external means for its rotation, and a clutch member fixed on the inner end of said shaft and consisting of the forks or prongs engaging suitable apertures in said shell, substantially as described.

8. In a rotary valve for double engines, the combination with the casing and the main inlet-valves, of the cut-off valves comprising the shell having the central steam-admitting slot 31, the exhaust-slots 34 and the narrow cut-off blocks 35, and the intake-slots 32 and broad cut-off blocks 33, substantially as described.

9. In a rotary valve, the combination of the valve-casing, the cut-off valve comprising the slotted shell, the main inlet-valve within said shell, the shaft for rotating said main inlet-valve, a bearing at one end of the casing for said shaft, a bevel-gear fixed on said shaft exterior to the casing, and another bevel-gear meshing with the first and transmitting power thereto from any suitable source, said bevel-gears serving to prevent end play of said valve, substantially as described.

In testimony that I claim the foregoing invention I have hereunto set my hand this 13th day of December, 1901.

GILBERT R. ELLIOTT.

Witnesses:
A. B. UPHAM,
FRANK A. SMITH.